United States Patent [19]
Serres

[11] Patent Number: 5,979,665
[45] Date of Patent: Nov. 9, 1999

[54] PAPER-PULP DEINKING METHOD AND EQUIPMENT TO IMPLEMENT THIS METHOD

[75] Inventor: Alain Serres, Reims, France

[73] Assignee: E & M Lamort, Vitry le Francois, France

[21] Appl. No.: 08/861,602

[22] Filed: May 22, 1997

Related U.S. Application Data

[62] Division of application No. 08/403,010, Mar. 10, 1995, Pat. No. 5,650,044.

[30]    Foreign Application Priority Data

Mar. 11, 1994  [FR]  France ................................. 94 02886

[51] Int. Cl.⁶ ................. B03D 1/24; D21C 5/02
[52] U.S. Cl. ............................. 209/170; 209/168
[58] Field of Search ................... 209/168, 170; 210/221.2; 162/4

[56]         References Cited

U.S. PATENT DOCUMENTS 3,865,719  2/1975  Holik et al. .
4,094,783  6/1978  Jackson .
4,186,094  1/1980  Hellberg .
4,331,534  5/1982  Barnscheidt .
4,347,128  8/1982  Barnscheidt .
4,399,028  8/1983  Kile et al. .
4,721,562  1/1988  Barnscheidt et al. .
4,722,784  2/1988  Barnscheidt .
4,952,308  8/1990  Chamberlin et al. .
5,028,315  7/1991  Cruea et al. .
5,242,585  9/1993  Krofta .
5,454,935  10/1995  Magaraggia .

FOREIGN PATENT DOCUMENTS

0 122 747   3/1984   European Pat. Off. .
0 198 737  10/1986   European Pat. Off. .
0 305 251   1/1988   European Pat. Off. .
35 24 071 A1  5/1985  Germany .
42 04 915 A1  2/1992  Germany .

*Primary Examiner*—Thomas M. Lithgow
*Attorney, Agent, or Firm*—Nixon & Vanderhye, P.C.

[57]            ABSTRACT

Equipment for deinking paper pulp, wherein the batch of pulp to be deinked is made to circulate to move from top to bottom whereas the air bubbles are introduced at least in the lower part and move from bottom to top, characterized in that the pulp descends from top to bottom while being recycled in several consecutive and superposed stages.

16 Claims, 6 Drawing Sheets

PAPER-PULP DEINKING METHOD AND EQUIPMENT TO IMPLEMENT THIS METHOD

This application is a divisional application of Ser. No. 08/403,010 filed Mar. 10, 1995. (now U.S. Pat. No. 5,650,044)

The object of the present invention is a method for deinking paper pulp and equipment with which to carry out said method.

In particular the present invention relates to deinking pulp from old paper to be recycled.

BACKGROUND OF THE INVENTION

When recycling old paper, it is first pulped by machinery commonly called pulpers and this pulp then is rid of its diverse foreign bodies called contaminants by being sifted. However, following contaminant elimination, the pulp still contains ink particles which must be eliminated if the pulp is used to manufacture high-grade paper.

It is already known to eliminate ink particles by blowing air into the pulp using bubble-generating injectors: thereupon a foam composed of thousands of bubbles appears above the pulp, the ink particles clinging to the walls of said bubbles.

Much air-injection machinery with which to carry out such deinking already has been described, illustratively in the European patent application EP 0,305,251 filed by applicant and in the German patent DE 35 24 071.

The European patent EP 0,122,747 describes deinking machinery wherein air is injected into a duct through which flows a pulp and which issues into the bottom of a receptacle whereby the bubbles rise through the pulp to form a foam carpet at the pulp surface; the foam is then sucked away.

The German patent DE 35 24 071 describes deinking machinery consisting of an enclosure where the pulp to be deinked is introduced at the said enclosure upper level, said pulp circulating along a spiral from top to bottom through the enclosure, part of this pulp being removed from the enclosure to be aerated and reinjected at the base and at the center of the enclosure.

Research by applicant has discovered that pulp deinking efficiency using air bubbling will be significantly improved by increasing the likelihood the bubbles will collide with the ink particles as said bubbles pass through the pulp.

Now the above described machinery are inadequate in this respect because being designed in such manner that the collision probability of the bubbles and the ink particles and the bubble transit times through the pulp are inadequate.

SUMMARY OF THE INVENTION

The paper-pulp deinking method of the invention causes opposite circulation of a pulp flow (top to bottom) and of a flow of air bubbles (bottom to top) and is characterized in that the pulp descends inside an enclosure, from top to bottom, while being recycled through several superposed stages.

This method may advantageously comprise the following features:
 the bubbles are generated in a self-recycling circuit located at the base of the pulp to be deinked, the other recyclings of the pulp being selectively carried out with or without air introduction,
 the quantity of liquid required to compensate for the water evacuated with the foam is introduced into the self-recycling circuit at the base of the pulp to be deinked,
 bubbles are generated at the base of the pulp to be deinked by insufflating compressed air,
 the quantity of liquid compensating the water evacuated with the foam is introduced at a level above the air-insufflation zone,
 a chemical additive enhancing bubble formation and adhesion of ink particles to the walls of said bubbles is added to the complementing liquid,
 a chemical additive enhancing elimination of ink particles is added to the pulp to be deinked,
 the bubbles are introduced in the form of foam through an orifice below the pulp; the different recycling stages of the pulp where called for may be carried out without introducing air; where called for, the foam may contain chemical products enhancing foaming and adhesion of ink particles to the walls of the foam bubbles.

The invention furthermore concerns equipment with which to implement the above method and is characterized in that it comprises: an enclosure with a plurality of intake orifices, a plurality of outlet orifices corresponding to said intake orifices; further a plurality of recycling circuits each fitted with a pump, at least one of these circuits comprising an air injector; the highest intake orifice being that at which the pulp to be processed arrives, the lowest outlet orifice being that through which the pulp is evacuated from the enclosure and each outlet orifice of the consecutive recycling stages being connected to that intake orifice which is located underneath the preceding intake orifice.

Moreover this equipment may comprise the following features:
 an enclosure fitted with a plurality of intake orifices, a plurality of outlet orifices corresponding to said intake orifices, and a plurality of recycling circuits each fitted with a pump, none of these recycling circuits comprising an air injector, the highest orifice being that receiving the pulp to be processed and the lowest outlet orifice being that through which the pulp is evacuated from the enclosure, each outlet orifice of the consecutive recycling stages being connected by conduits to that intake orifice immediately below the preceding intake orifice, the enclosure being fitted at its base with an appropriate water or liquid recycling circuit comprising an outlet connected by an air-injector fitted conduit to an intake orifice located at a lower level at the lowest of the pulp recycling circuits in such manner that the bubbles are only generated in the recycling circuit located below the pulp recycling circuit(s),
 the lower liquid recycling circuit wherein the bubbles are created is replaced by an orifice through which the foam is introduced directly,
 the lower liquid recycling circuit is replaced by an orifice through which compressed air is introduced, the enclosure comprising a screen above said orifice to form bubbles that will spread through the entire pulp,
 a water intake duct issues into the enclosure at a level above the bubble spreading screen,
 baffles are positioned between the corresponding pulp intakes and outlets,
 each baffle comprises a vertical cylindrical part opposite the intake orifice and an oblique conical part leading to corresponding the outlet orifice in such manner that the flow from the one to the other rises to move above the vertical part and then descends toward the outlet orifice, the bubbles passing from one stage to the other in the space subtended between the vertical baffle walls and the inner enclosure wall, gates are located between the vertical baffle walls and the inner enclosure wall, the gates consist of a planar wall perpendicular to the vertical enclosure axis and coiling spirally between the inner enclosure wall and the corresponding vertical baffle wall, said spiral wall rising from the lower part of each intake orifice in the form of several sections and steps to its upper part, said steps being offset in height to subtend slots through pass the bubbles.

Preferably the pulp is made to circulate so as to move vertically from top to bottom whereas the air bubbles are introduced in the lower part of said pulp to cross it from bottom to top.

The present invention also relates to equipment implementing the above method and wherein take place said two mutually opposite circulatory flows, and comprising recycling means.

BRIEF DESCRIPTION OF THE DRAWINGS

An illustrative embodiment is shown in non-limiting manner in the attached drawings.

DETAILED DESCRIPTION OF THE PREFERRED EMBODIMENTS

Figure 1:
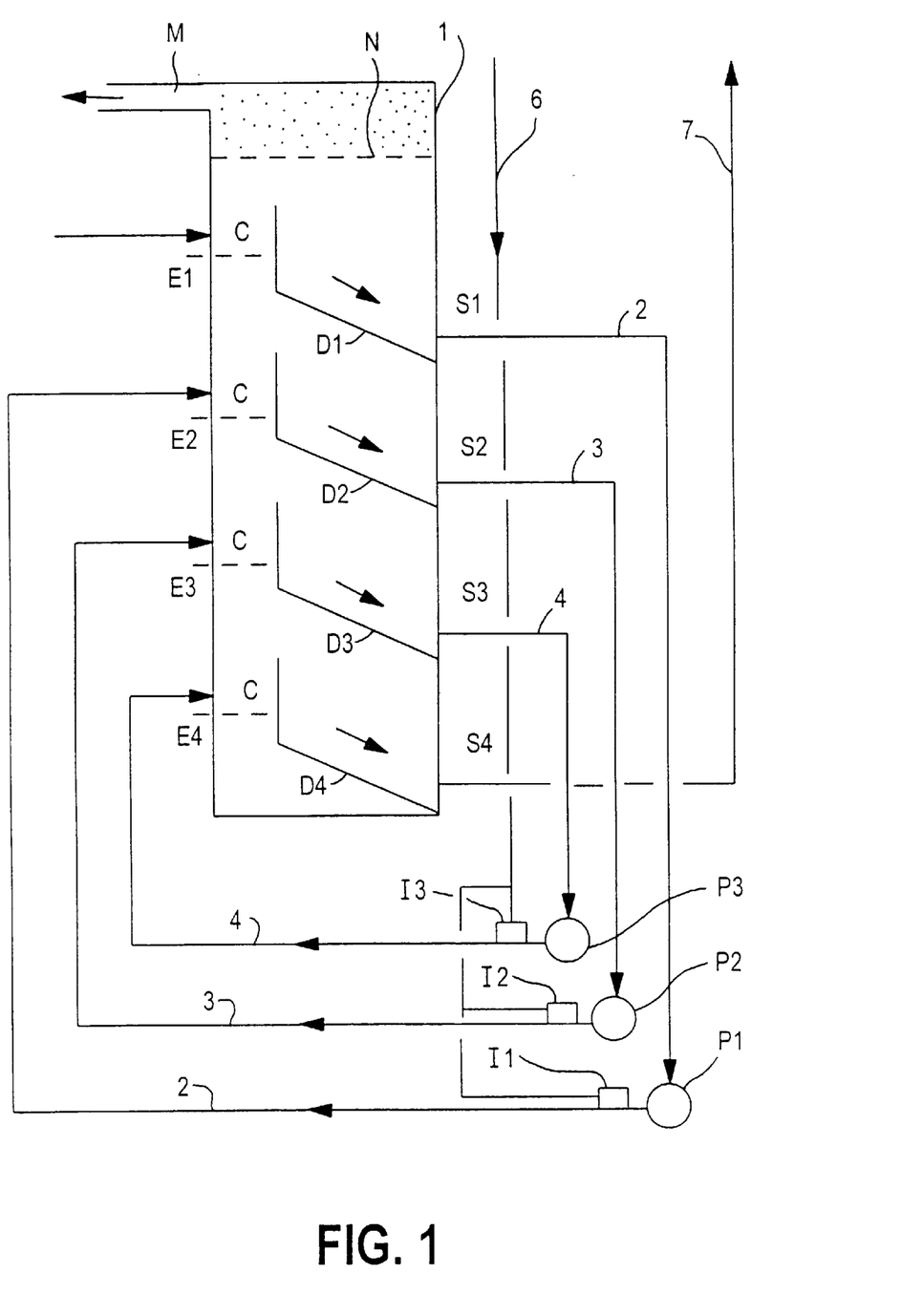
FIG. 1 is a schematic of a first equipment implementing the method of the invention.
Figure 2:
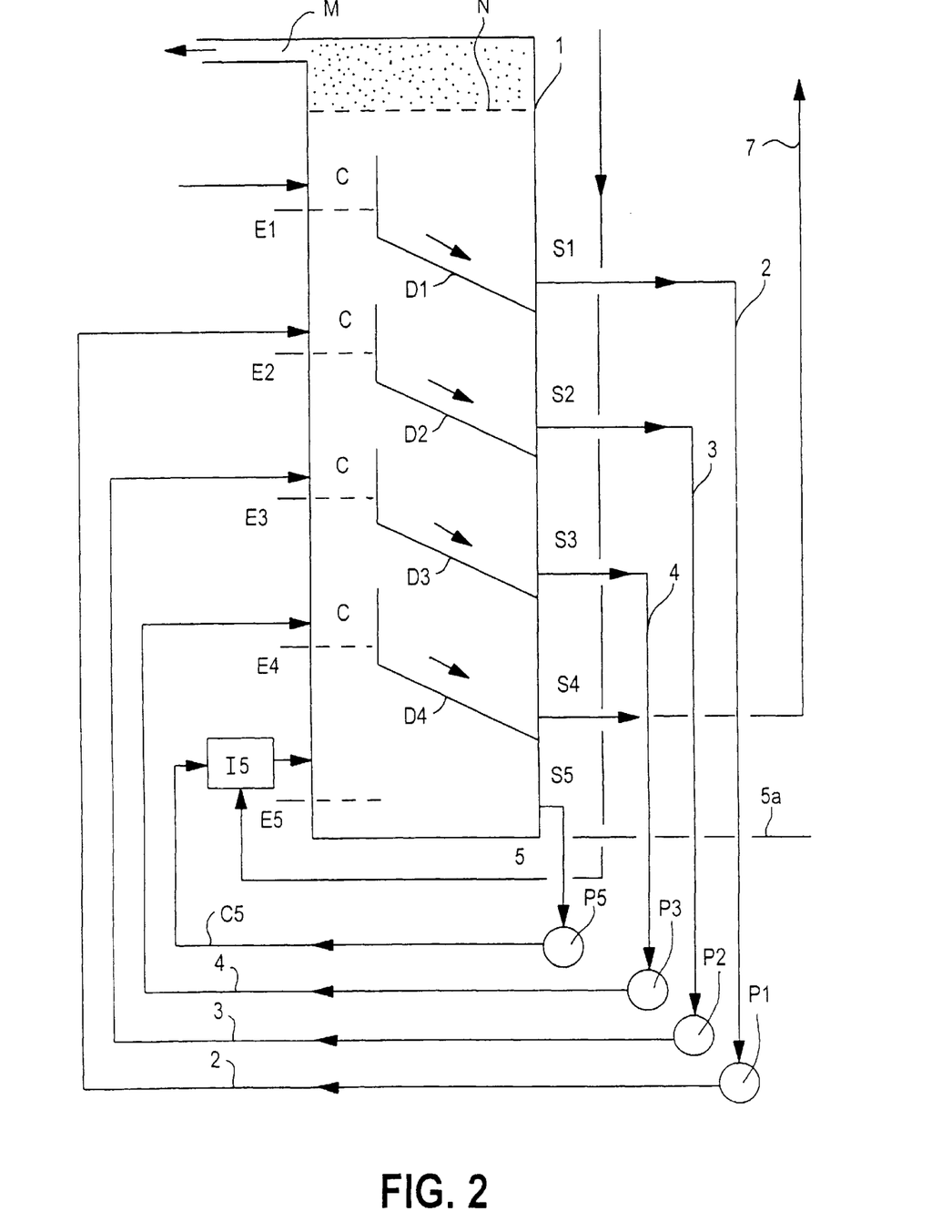
FIG. 2 is a schematic of a second equipment implementing the method of the invention.
Figure 3:
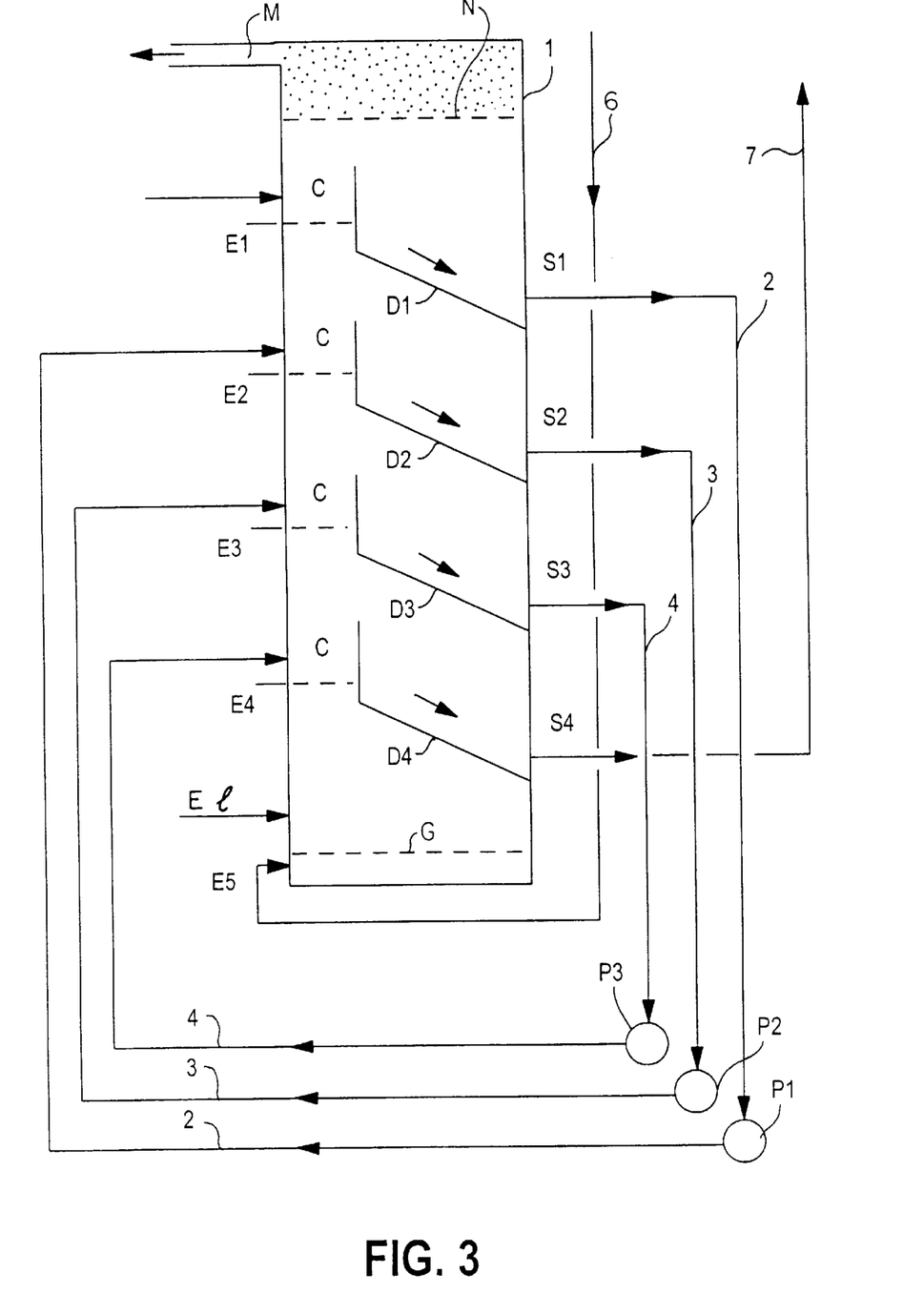
FIG. 3 is a schematic view of a third equipment implementing the method of the invention.

FIGS. 1 through 3 are schematics. In these Figures, the enclosure 1 is shown being a parallelipiped of rectangular cross-section fitted with a plurality of baffles D, in the embodiment shown four baffles ($D_1$, $D_2$, $D_3$, $D_4$); this embodiment comprises a vertical and a horizontal part. The purpose of the schematic representation is clarity in the exposition of the principle of the operation; however, as shown by FIGS. 4 through 7, the enclosure preferably is a cylinder of revolution, the vertical baffle walls being cylinders of revolution and the oblique walls being conical surfaces.

FIG. 1 shows a first embodiment of the equipment consisting of a vertical enclosure 1 comprising, from top to bottom, four intake orifices E denoted by $E_1$, $E_2$, $E_3$, $E_4$ and four outlet orifices S denoted by $S_1$, $S_2$, $S_3$, $S_4$.

The pulp to be deinked enters the highest-level intake orifice $E_1$.

Each intake orifice such as $E_1$ is associated with an outlet orifice $S_1$ whereby most and even all the flow entering the enclosure at $E_1$ will leave it through $S_1$. The outlet orifice $S_1$, is connected to the intake $E_2$ below the intake $E_1$ in order that the product so recycled shall be recycled at a lower level.

In the embodiments shown, the outlet orifices $S_1$, $S_2$, $S_3$, $S_4$ are located at a lower level than the intake orifices $E_1$, $E_2$, $E_3$, $E_4$ with which they are associated, though this feature is not mandatory.

In the embodiments, the second intake orifice $E_2$ is slightly lower than the first outlet orifice $S_1$; the third intake orifice $E_3$ is slightly lower than the second outlet orifice $S_2$; the fourth intake orifice $E_4$ is slightly lower than the third outlet orifice $S_3$; the fourth outlet orifice $S_4$ is located at the bottom of the enclosure 1.

The deinked pulp is evacuated through the orifice $S_4$.

The enclosure 1 comprises one or more orifices M at its upper part to evacuate the foam.

The outlet orifice $S_1$, is connected to the intake orifice $E_1$ by a duct 2 into which is inserted a pump $P_1$. Similarly the outlet orifice $S_2$ is connected by a duct 3 to the orifice $E_3$, a pump $P_2$ being in-line, and the orifice $S_3$ is connected through a pump $P_3$ to the orifice $E_4$.

Operation is as follows:

The pulp is fed by any suitable means through $E_1$ into the enclosure 1 which is filled to level N that is located above the orifice $E_1$ but below the foam-evacuating duct M.

When the level is reached, the recycling pumps $P_1$, $P_2$ and $P_3$ are turned ON.

The pulp arriving through $E_1$ is evacuated in part or in whole through the orifice $S_1$, the duct 2 allowing reintroducing it through the orifice $E_2$ into the enclosure.

The pulp reintroduced at $E_2$ is evacuated in part or in whole through the orifice $S_2$ and is reintroduced at $E_3$; from $E_3$ it exits through $S_3$ and is reintroduced at $E_4$; and it moves from $E_4$ to the outlet $S_4$ where it is evacuated through the duct 7.

Preferably an air injector $I_3$ fed from an air conduit 6 is associated with the pump $P_3$ which is where the pulp is recycled at the lowest point of the enclosure 1. As a result the pulp flow arriving at $E_4$—which is the lowest intake orifice of the enclosure—will be loaded with air bubbles. These air bubbles rise, whereby the pulp recycled at $S_3$, $S_2$ and $S_1$ is mixed again with the bubbles and accordingly the bubbles finally arriving at the level M mixed with the pulp were stirred into it several times and the likelihood of collision between them and the ink particles has been increased.

Additional air injectors $I_2$ and $I_1$ may be used in association with the pumps $P_2$ and $P_1$, whereby the quantity of bubbles rising through the descending pulp will be increased.

In the shown embodiment, three recycling circuits $S_1$-$E_2$, $S_2$-$E_3$, $S_3$-$E_4$ are being used, obviously however the invention is not restricted to this particular implementation.

There may be only a single recycling circuit just as well as there may be more than three.

Furthermore means guiding the recycling flows may be mounted inside the enclosure 1.

As shown by FIG. 1, a baffle D may be placed between each intake E and each outlet S; for instance a baffle $D_1$, between $E_1$ and $S_1$; $D_2$ between $E_2$ and $S_2$; $D_3$ between $E_3$ and $S_3$ and $D_4$ between $E_4$ and $S_4$; the outlet orifices $S_1$, $S_2$, $S_3$, $S_4$ each being located below the intake orifice $E_1$, $E_2$, $E_3$, $E_4$.

Preferably and as shown, each baffle D comprises a vertical wall opposite the intake orifice E and an inclined wall slanting toward the outlet orifice S.

Furthermore gates C are present between the vertical part of the baffle D and the inside wall of the enclosure 1 to allow the bubbles to rise while preventing the pulp from descending.

Accordingly the flow arriving through each intake orifice E cannot pass, or with great difficulty, through the gates C and is forced to move around the obstacle in the form of the vertical part of the baffle D and must descend again along the slanted wall toward the corresponding outlet orifice.

Because of these baffles, the pulp descends from top to bottom of the enclosure 1 only progressively and through consecutive recycling steps.

FIG. 2 shows a second embodiment wherein the identical components are identically referenced.

These two embodiments differ in that now there is only one air injector $I_4$ which is associated with a particular recycling circuit 5 fitted with a pump $P_4$.

This circuit 5 is particular in that it is designed to recycle only water. This water is introduced upon demand through a duct 5a.

Some amount of water inevitably is dragged along the foam, as a result of which a little water must be added. Moreover, at startup, the bottom of the enclosure 1 must be filled with water: thus this water is introduced upon demand. It arrives through an additional orifice $E_5$ below $E_4$ in the enclosure 1 and leaves through an outlet orifice $S_5$ below $S_4$. Accordingly this water circulates in a closed loop $S_5$, 5, $P_5$, 5, $I_5$ and $E_5$ practically without mixing with the pulp. Air is blown into this water by the injector $I_5$ and the bubbles rise vertically in the passageway between the vertical walls of the baffles D and the inside wall of the enclosure 1.

A chemical additive enhancing bubble formation and ink-particle adhesion to the bubble walls may thus be added to the water moving through the injector $I_5$. Also and in lieu of water, any other suitable liquid may be used within which bubbles shall be generated that then rise through the pulp above. In a variation not shown herein, it is even feasible to introduce a foam at $E_5$ without using a liquid in which bubbles would be generated.

In this instance, the air being injected only into a water circuit, the danger of injector clogging will be averted; therefore air injection nozzles of lesser diameters may be used and the pulp will be introduced into the enclosure 1 in simpler manner without injectors.

Bubble formation being independent of pulp concentration, a larger amount of bubbles is achieved for a given volume and thereby smaller deinking enclosures may be used.

Moreover another chemical additive may be used in the pulp to eliminate the ink particles.

FIG. 3 shows an embodiment variation of FIG. 2. In this variation, the recycling circuits 2,3,4 with pumps $P_1$, $P_2$, $P_3$ are without any air injection means, as in the case of the equipment of FIG. 2, and the air is introduced only at the base of the enclosure 1. However in this instance of FIG. 3, the base of the enclosure is without a water recycling circuit fitted with air introduction. In this variation, the air fed through the duct 6 is directly injected into the base of the enclosure 1 through the orifice $E_5$.

To better spread the bubbles, a screen G fitted with a large number of orifices is mounted at a level higher than the air feed $E_5$.

The water required to compensate that evacuated in the foam is introduced through the orifice E1 above the screen G.

Just as was the case for FIG. 2, obviously here too a bubble-formation enhancing chemical may be added to the water.

FIGS. 1 through 3 are schematics; however FIGS. 4 through 8 relate to a physical embodiment mode of the invention.

The Figures show that the equipment is composed of a cylindrical enclosure 10 comprising a central tubular column 11 inside which are mounted a central tube 12 and four tubes 13, 14, 15, 16. The two tubes 11 and 12 are concentric and above them rises a cone 17 of which the upper part is fitted with an annulus of holes or passages 18.

Four annular superposed devices 19, 20, 21 and 22 corresponding to the baffles D of FIGS. 1 through 3 are mounted around the central column 11.

Figure 4:
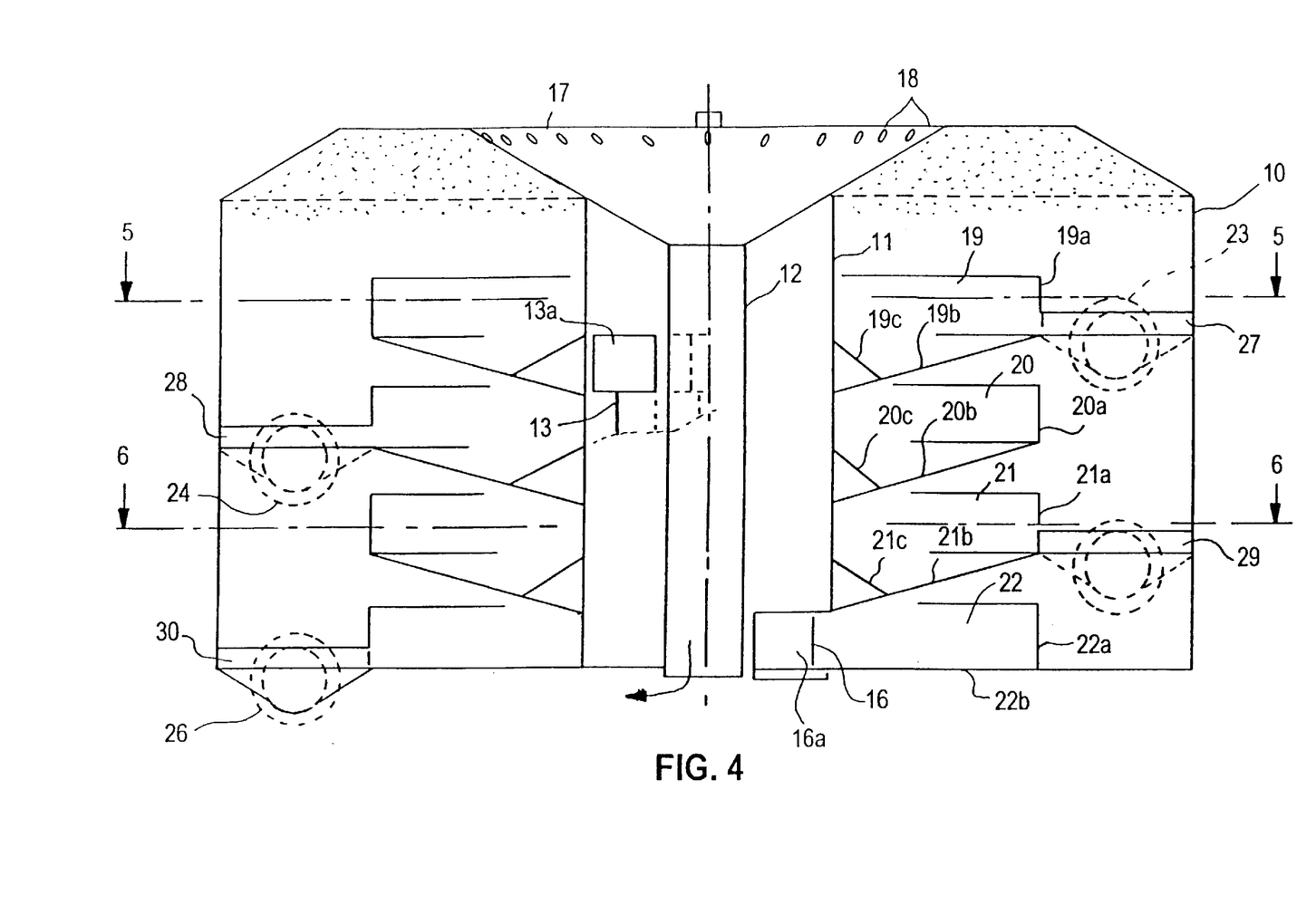
FIG. 4 is a schematic showing a section along C—C of FIGS. 5 and 6 of an embodiment of the baffles of equipment of the invention.

Preferably these annular devices comprise a vertical wall 19a, 20a, 21a, 22a and a conical end 19b, 20b, 21b, the end 22b of the lowermost device being flat and laid on the bottom of the enclosure 1.

An intake orifice 23 through 26 corresponds to each annular device 19 through 22.

At the base of each annular device, the central column 11 is perforated by a window 13a, 14a, 15a, 16a each communicating with one of the tubes 13, 14, 15, 16.

To simplify FIG. 4, only two windows 13a and 16a and part of the tube 13 are shown in FIG. 4.

The intake orifices 23 through 26 correspond to the intakes $E_1$ through $E_4$ of FIGS. 1 through 3; the windows 13a through 16a correspond to the outlets $S_1$ through $S_4$; the recycling circuits and their pumps are omitted.

FIG. 4 shows that the base of the conical parts 19b, 20b and 21b is capped by a hood 19c, 20c and 21c evincing an irregular conical shape.

Figure 5:
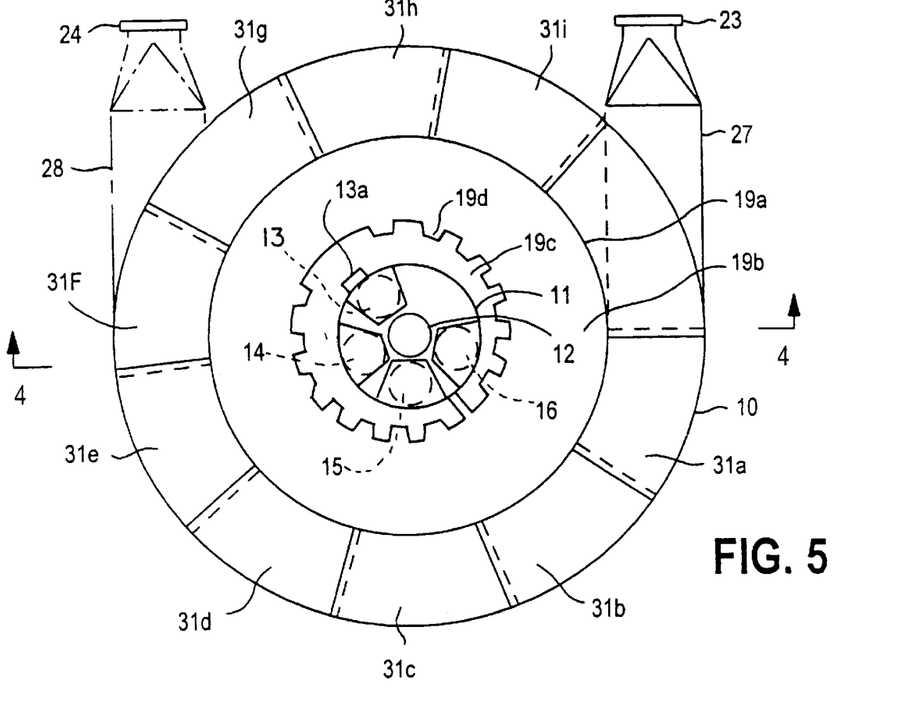
FIG. 5 is a top and a sectional view along A—A of FIG. 4.
Figure 6:
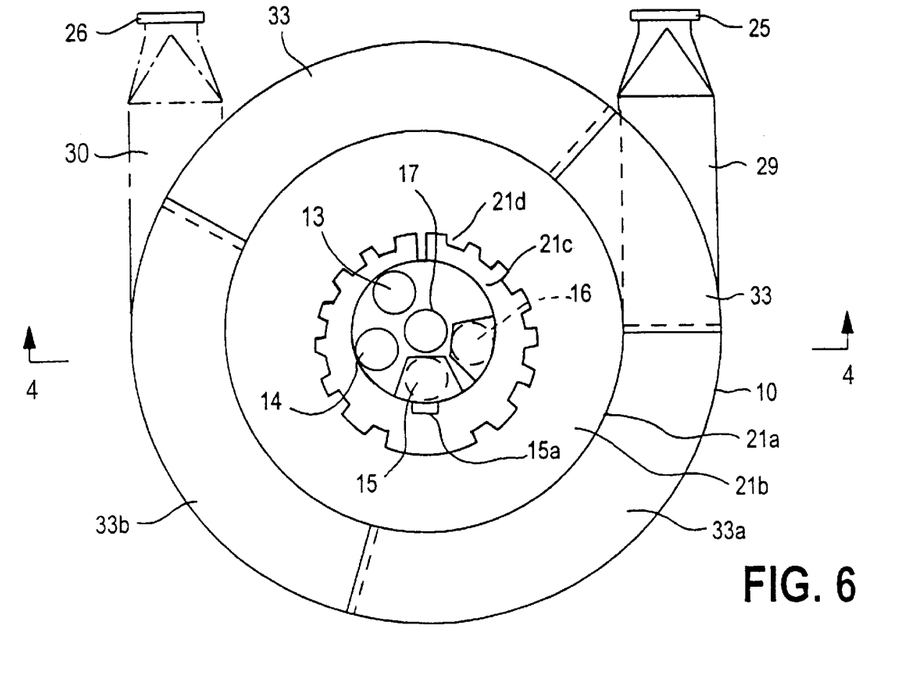
FIG. 6 is a top and a sectional view along B—B of FIG. 4.

FIGS. 5 and 6 show that each of the conical hoods 19c, 20c and 21c is excentric relative to the axis of the central column 11 in such a way that its largest portion be above the corresponding window 13a, 14a or 15a. Each hood 19c, 20c, 21 comprises at its base apertures 19d, 20d, 21d to pass the pulp in the direction of the window 13a, 14a or 15a.

Each of the circular intakes 23 through 26 is associated with a flat, cross-sectionally rectangular box 27 through 30. The width of said box is such that it occupies the entire space between the enclosure wall and the vertical wall 19a, 20a, 21a of the corresponding annular device 19, 20, 21. Beyond each of said boxes 27 through 30, said space is taken up by a gate system 31 through 34 corresponding to the gates C of FIGS. 1 through 3.

Figure 7:
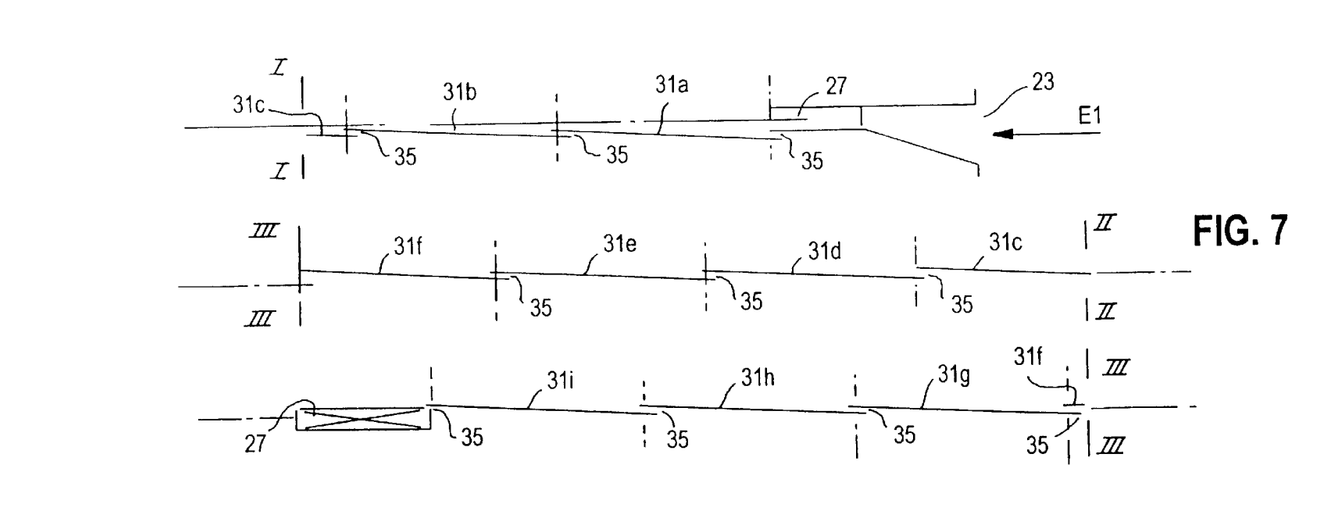
FIG. 7 is a schematic and geometrically developed view of the gate of FIG. 5.

FIGS. 5 through 7 illustrate the gate system 31 which is consecutive to the box 27 associated with the intake 27. This system is helical and therefore is shown circular in FIG. 5 whereas FIG. 7 is geometrically developed and therefore said system therein is shown rectilinear. On the other hand, its length is such that it was cut into three segments in FIG. 7.

As shown in this Figure, the gate system 31 consists of a planar sheetmetal or plate which curls by 360° around the annular system 19 while occupying all the space between said annular system and the inner wall of the enclosure 1, progressively rising from the lower side of the outlet of the box 27 (as far as its upper side). The planar sheetmetal of the gate system 31 is cut into nine segments 31a through 31i which are partly overlapping while leaving a spacing 35 between them. The bubbles arriving from the lower recycling stage will move through the spacings 35.

Figure 8:
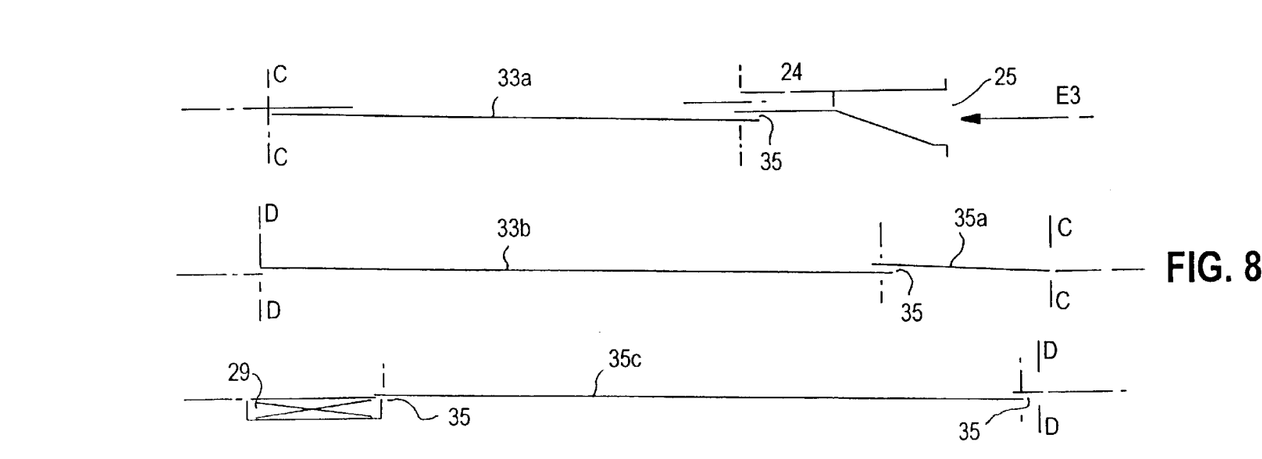
FIG. 8 is a schematic and geometrically developed view of the gate of FIG. 6.

FIGS. 6 and 8 illustrate similarly the gate system 33 which is analogous to the system 31 except that it consists only of three segments 33a through 33c.

The pulp to be deinked is introduced at 23 and evacuated through the window 13a and will descend through the tube 13 to be reintroduced at 24, to be again evacuated through the window 14a, to descend through the tube 14 and be reintroduced at 25, to be evacuated through the window 15*a*, to descend through the tube 15, to be reintroduced at 26 and be evacuated through the window 16*a* and the tube 16 and then be introduced again.

The recycling circuits connected to 24, 25 and 26 may all be fitted with air injectors as shown in FIG. 1 or else the air is injected only in the lower circuit at the level of the intake 26 in the manner discussed in relation to FIG. 2.

Accordingly motion of the pulp to be deinked takes place from top to bottom, comprising consecutive recyclings, and another motion takes place from bottom to top, namely that of the bubbles through the pulp being recycled in several stages; said bubbles pass through the gates 35 from one stage to the next.

Each annular gate system 31 through 34 operates on one hand to let the bubbles coming from the lower stage pass through the gates 35, while on the other hand forcing the pulp to ascend along the walls 19*a*, 20*a*, 21*a*, whereafter the pulp can redescend into the hopper-shaped component 19*b*, 20*b*, 21*b* at the end of which is located the evacuation window 13*a*, 14*a*, 15*a*.

The foam so formed rises to the upper part of the enclosure 1 and then passes through the holes 18 into the hopper 17 and descends through the central tube 12 through which it is evacuated.

What is claim is:

1. Equipment to implement a method for deinking paper pulp, whereby the pulp to be deinked is made to circulate in such manner that the pulp moves from a top to a bottom of said equipment while air bubbles are introduced at a lower portion of said equipment and move from said bottom to said top, and the pulp descends from said top to said bottom by being recycled in several superposed and consecutive stages, said equipment comprising: an enclosure (1) fitted with a plurality of intake orifices, a plurality of outlet orifices corresponding to said intake orifice, and a plurality of recycling circuits (2, 3, 4) each fitted with a pump ($P_1$, $P_2$, $P_3$), means for introducing air into at least a lower portion of said enclosures (1), a highest intake orifice being that where the pulp to be deinked is fed into said enclosure a lower outlet orifice being that through which the deinked pulp is evacuated from the enclosure (1), each outlet orifice of the consecutive recycling stages being connected to that intake orifice which is located below the preceding intake orifice, baffles located between the pulp intakes and the corresponding pulp outlets, and gates located between the pulp intakes and the baffles, said gates allowing the air bubbles introduced at the lower portion of the enclosure to rise-up from said lower portion to the top of said enclosure while also preventing the pulp from descending thereby causing the pulp to flow into said baffles.

2. Equipment defined in claim 1 wherein each baffle comprises a cylindrical vertical part opposite the intake orifice and a conical oblique part leading to the corresponding outlet orifice in such manner that the flow from one to the other rises to pass above the vertical part and then descends toward the outlet orifice, the bubbles, moving from one stage to the other in the space subtended between said vertical parts of the baffles and the inside wall of the enclosure (1).

3. Equipment defined in claim 2 wherein said gates are present in said space subtended between the vertical walls of the baffles and the inside wall of the enclosure.

4. Equipment defined in claim 3 wherein the gates include a planar wall perpendicular to the vertical enclosure axis and coiling in a spiral between the inside wall of the enclosure (1) and the vertical wall of the corresponding baffle said wall rising in segments arranged in steps from its lower zone at each intake orifice to its upper zone, said segments being height-offset in such a way as to subtend slots (35) passing the bubbles.

5. Equipment defined in claim 1, wherein the enclosure (1) is cylindrical, the baffles being constituted by annular devices (19, 20, 21, 22) comprising a cylindrical vertical wall (19*a*, 20*a*, 21*a*, 22*a*) and an end (19*b*, 20*b*, 21*b*, 22*b*) crossed by a tubular central column (11).

6. Equipment defined in claim 5 wherein, except for the lower annular device (22) fitted with a flat end (22*b*), the other annular devices evince a conical end (19*b*, 20*b*, 21*b*) in the shape of a hopper.

7. Equipment defined in claim 6, wherein a window (13*a*, 14*a*, 15*a*, 16*a*) in the central column (11) and communicating with an evacuation tube (13, 14, 15, 16) is present at the very end of each annular device (19, 20, 21, 22).

8. Equipment defined in claim 7 wherein each window (13*a*, 14*a*, 15*a*, 16*a*) is capped by a conical hood (19*c*, 20*c*, 21, 22*c*) fitted with apertures (19*d*, 20*d*, 21*d*, 22*d*).

9. Equipment defined in claim 7, wherein the tubes (13, 14, 15, 16) evacuating the pulp from the enclosure (1) for purposes of recycling are mounted inside the central column (11).

10. Equipment defined in claim 1, wherein said means for introducing air comprises an air injector on each of said recycling circuits.

11. Equipment defined in claim 1, wherein said means for introducing air comprises an air injector on a lowest one of said recycling circuits.

12. Equipment defined in claim 1, wherein said means for introducing air comprises an air pipe.

13. Equipment to implement a method for deinking paper pulp, whereby the pulp to be deinked is made to circulate in such manner that the pulp moves from top to bottom while air bubbles are introduced only in a lower part and move from bottom to top, and the pulp descends from top to bottom by being recycled in several superposed and consecutive stages, the equipment comprising an enclosure (1) fitted with a plurality of intake orifices ($E_1$, $E_2$, $E_3$, $E_4$, etc), a plurality of outlet orifices ($S_1$, $S_2$, $S_3$, $S_4$, etc) corresponding to said intake orifices and a plurality of recycling circuits (2, 3, 4 . . . ) each fitted with a pump ($P_1$, $P_2$, $P_3$, . . . ), none of said recycling circuits comprising an air injector, the highest intake orifice ($E_1$,) being that where the pulp to be deinked arrives and the lower outlet orifice ($S_4$) being that through which deinked pulp is evacuated from the enclosure, each outlet orifice of the consecutive recycling stages being connected by ducts (2, 3, 4 . . . ) to the intake orifice immediately below the preceding intake orifice, the enclosure (1) being fitted at its base with an appropriate water or liquid recycling circuit comprising an outlet ($S_5$) connected by a conduit (5) fitted with an air injector ($I_5$) to an intake orifice ($E_5$) located at a level lower than the lower most level of the pulp recycling circuit and above ($S_5$) in such manner that the bubbles shall only be generated in the recycling circuit located below the pulp recycling circuit(s).

14. Equipment to implement a method for deinking paper pulp, whereby the pulp to be deinked is made to circulate in such manner that the pulp moves from top to bottom while air bubbles are introduced only in a lower part and move from bottom to top, and the pulp descends from top to bottom by being recycled in several superposed and consecutive stages, the equipment comprising an enclosure (1) fitted with a plurality of intake orifices ($E_1$, $E_2$, $E_3$,$E_4$, etc), a plurality of outlet orifices ($S_1$,$S_2$,$S_3$, $S_4$ etc) corresponding to said intake orifices and a plurality of recycling circuits (2, 3, 4 . . . ) each fitted with a pump ($P_1, P_2, P_3$, . . . ), none of said recycling circuits comprising an air injector, the highest intake orifice ($E_1$,) being that where the pulp to be deinked arrives and the lower outlet orifice ($S_4$) being that through which deinked pulp is evacuated from the enclosure, each outlet orifice of the consecutive recycling stages being connected by ducts (2, 3, 4 . . . ) to the intake orifice immediately below the preceding intake orifice, the enclosure (1) being fitted at its base with an orifice ($E_5$) through which one of at least foam and compressed air is introduced.

16. Equipment defined in claim 15 comprising a water feed conduit (E1) issuing into the enclosure (1) above the bubble-spreading screen (G).

15. Equipment defined in claim 14, wherein the enclosure (1) further comprises a screen (G) located above said orifice ($E_5$) to generate bubbles spreading through the entire pulp.

* * * * *